United States Patent

[11] 3,566,070

| [72] | Inventor | Alain Edouard Plegat<br>Asnieres, France |
|---|---|---|
| [21] | Appl. No. | 804,087 |
| [22] | Filed | Mar. 4, 1969 |
| [45] | Patented | Feb. 23, 1971 |
| [73] | Assignee | Societe Anonyme Des Usines Chausson<br>Asnieres, France |
| [32] | Priority | Mar. 20, 1968 |
| [33] | | France |
| [31] | | 144,620 |

[54] MACHINE FOR SOLDERING ON WORK PARTS, MORE PARTICULARLY FOR SOLDERING WATER BOXES ON COLLECTORS OF HEAT EXCHANGERS
5 Claims, 4 Drawing Figs.

[52] U.S. Cl. ................................................ 219/85,
219/79, 219/159, 219/388
[51] Int. Cl. ................................................ B23k 1/04
[50] Field of Search ........................................ 219/85, 79, 80, 159, 388; 263/7; 228/47—49

[56] References Cited
UNITED STATES PATENTS

| 2,591,065 | 4/1952 | Habel | 219/85 |
| 2,762,320 | 9/1956 | Ireland | 263/7 |
| 2,813,502 | 11/1957 | Drom | 219/85 |
| 3,215,810 | 11/1965 | Lange | 219/79 |
| 3,247,355 | 4/1966 | Olsen | 228/47 |
| 3,318,503 | 5/1967 | Plegat | 228/47 |
| 3,407,985 | 10/1968 | Miller | 219/85 |

*Primary Examiner*—Milton O. Hirshfield
*Assistant Examiner*—R. Skudy
*Attorney*—Irving M. Weiner ABSTRACT: A machine for soldering water boxes on the collectors of heat exchangers including a circular rotatable table fitted with mountings for the water boxes and the heat exchangers. The machine includes means to press each water box on its associated heat exchanger, and a fixedly mounted infrared row located above the rotatable table on a portion of its periphery.

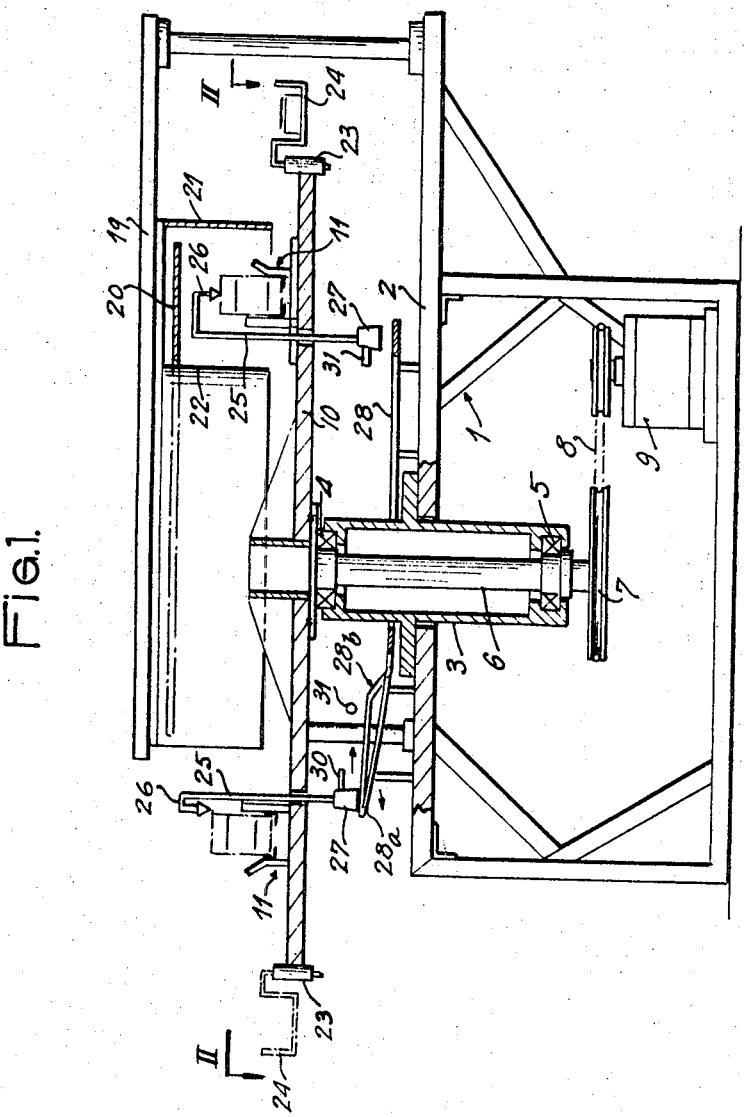

MACHINE FOR SOLDERING ON WORK PARTS, MORE PARTICULARLY FOR SOLDERING WATER BOXES ON COLLECTORS OF HEAT EXCHANGERS

The present invention relates to a machine of the turnstile kind for soldering work parts and more particularly for soldering water boxes on collectors of heat exchangers.

Up till now, these operations are carried out by gas burners in front of which the work parts are brought. In some cases, particularly for soldering piping on water boxes at the same time as said water boxes are soldered on to the collectors, it is necessary to provide moveable gas rows which are shifted in synchronism with the revolving of the turnstile. This leads to mechanical complications and also frequently some work parts to be soldered are heated more than others, so that solderings are not perfect.

The present invention seeks to obviate these disadvantages by creating a new machine.

According to the invention, the machine comprises a revolving table, fixed mountings that are removable on said table on its periphery, said mountings all comprising identical sockets but provided with supports suited to the various types of work parts to be operated upon, so that the part of these parts to be soldered extends substantially always in a horizontal plane, and rows of infrared radiation supported by an armature fixed over said table on only one part of the periphery of the table.

Various other characteristics of the invention will moreover be revealed by the detailed description which follows.

A form of embodiment of the object of the invention is shown, by way of nonrestrictive example, in the accompanying drawing:

FIG. 1 is a diagrammatic elevation section of a soldering machine according to the invention.

Figure 2:
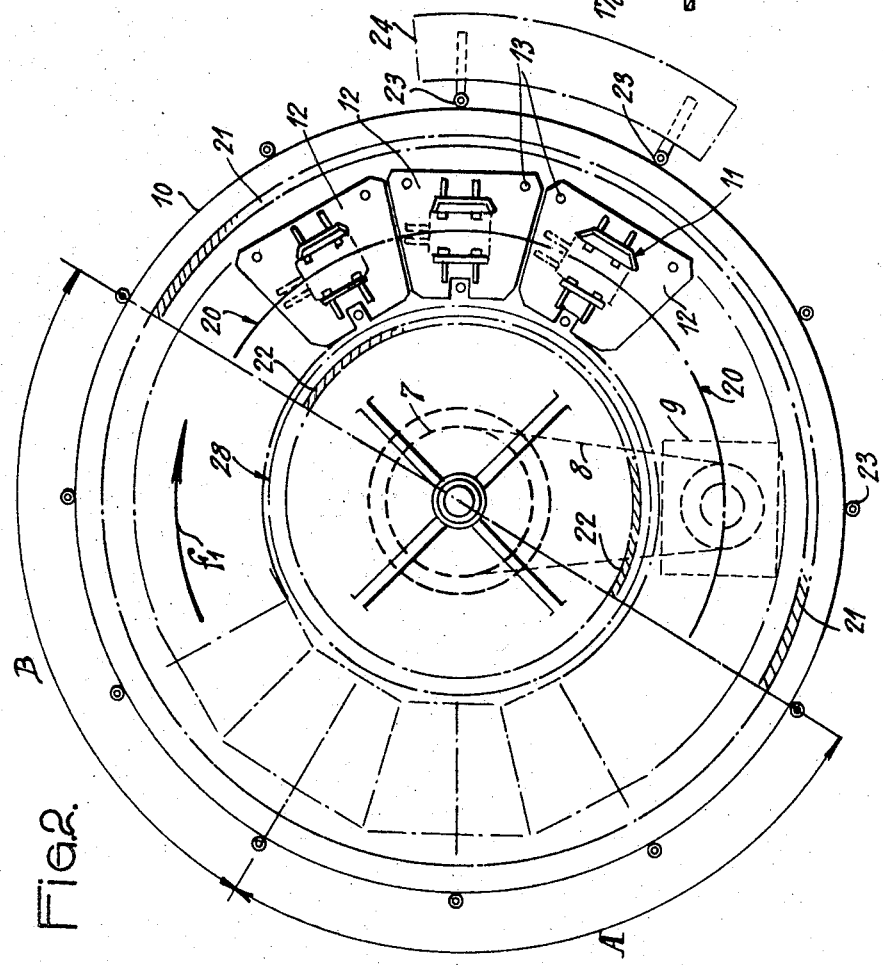
FIG. 2 is a diagrammatic section seen substantially along the line II–II of FIG. 1.

The machine as shown in FIG. 1 is supported by a frame designated generally as 1, this frame having a table 2 on its top, that can be continuous or discontinuous. This frame supports a shaft 6 by a casing 3 and bearings 4 and 5. The shaft 6 is driven by a grooved wheel 7 connected by one or more belts 8 to a reducing-motor 9. Reference numeral 10 designates a circular table which is carried and driven by the shaft 6 for revolving at slow speed with said shaft, for example, in the region of 1 r.p.m., which speed can be adjustable. The table 10 is intended to support mountings such as those shown in FIGS. 2 to 4 which are designated generally by the reference numeral 11 and which all have identical sockets 12, having, for instance, a substantially trapeze shape. The table 10 - mounting 11 link can be effected in numerous different ways, the essential being that the method of linking enables easy and speedy interchangeability of one mounting for another. By way of example, the sockets 12 of the mountings 11 can be held on the table 10 merely by pins or studs 13 or else by bolts or any kind of clamps. The trapeze shape of the sockets is preferred, for, in this way, the mountings 11 can be practically arranged one against the other on the periphery of the table 10, said trapeze shape enabling to compensate for the length of the circumference tangent to the opposite edges of said sockets. The mountings 11 are intended to support heat exchangers which are shown in FIGS. 3 and 4, according to which these exchangers, which are of two different types, respectively designated by a and b, nevertheless comprise one and the other a cluster 14, for instance, of a tube a fin plate type, two collectors 15 and 15a and water boxes 16 and 16 a which are to be soldered on said collectors by the machine of the invention.

Figure 4:
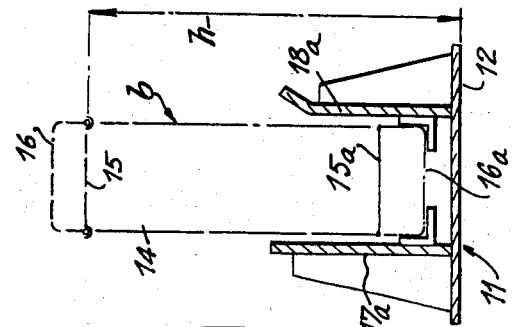
FIG. 4 is an elevation similar to FIG. 3 showing another characteristic of the invention.
Figure 3:
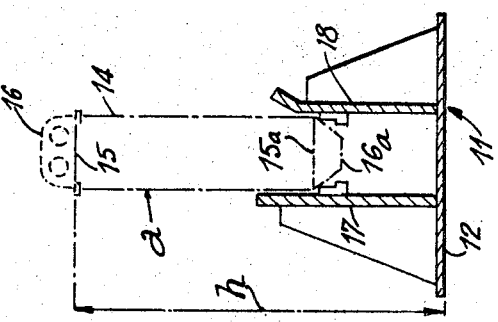
FIG. 3 is an elevation section on a larger scale, showing a particular characteristic of the invention.

As explained in the foregoing, while the socket 12 of all the mountings 11 are identical, this does not apply to the slides 17, 18 or 17a, 18a, according as to whether we look at FIG. 3 or FIG. 4, for these slides are, on the contrary, adapted to the types of heat exchangers which must be supported in the mountings for being operated on by the machine. Actually, according to the types of exchangers to be worked upon, as is clearly shown in FIGS. 3 and 4, said exchangers can be of various heights, widths or thicknesses and said mountings are provided, on the one hand, obviously to support each one a particular type of exchanger, and on the other hand, so that the parts of exchangers for soldering, in this case the water boxes 16 onto the collectors 15, in the case of FIGS. 3 and 4, are always at a height $h$ of the table of the machine, whatever the height of said exchangers.

Referring again to FIG. 1, we see that the table 2 supports an armature 19 which is thus fixed and extends above the table 10.

The armature 19 supports infrared radiation rows 20 which extend above the table 10 and on a circle portion which can, for instance, be at 180°. Preferably the armature 19 also supports curved partitions 21, 22 descending as far as the vicinity of the table top 10, these being shaped in an arc of a circle for confining a corridor or tunnel in which the rows of infrared radiation are placed.

When said infrared rows extend over an arc of about 180° and looking at the rotation shown by the arrow $f_1$ for the table 10, then a zone designated by A is provided beyond said rows and said tunnel, which zone is called a cooling zone, this zone extending over an arc length of about 90° and then a second zone called B is designated, called a charging and discharging zone which then also extends over an arc length of 90°.

So that the working rate of the machine is as high as possible, while a single workman proceeds with charging and discharging said machine, i.e., the withdrawal and positioning of the heat exchangers to be soldered in zone B, it is advantageous to provide the peripheric edge of the table 10 of support 23 with sleeves, for example, enabling receptacles 24 to be hooked on, in which are positioned cores such as 14, water boxes such as 16 or 16a, soldering rings, etc. which can then be placed in said receptacles 24 outside the charging zone B. Moreover, said receptacles 24 enable, if so required, the draining of parts that have been previously plunged into a flux bath enabling soldering to be suitably carried out.

In the preferred application of the soldering machine for attaching water boxes 16 to collectors 15, it is necessary that said water boxes be kept under a certain pressure in the necks of the collectors whilst soldering itself is being carried out, which obviously occurs when the exchangers pass under the infrared radiation rows 20. To this end, it is advantageous, as shown diagrammatically in FIG. 1, to provide thrust rods 25 placed facing each mounting 11. Said rods have, for instance, at the top part, a jib shape 26 for bearing on the top of water boxes and are axially guided in holes of the table 10. Moreover, the rods 25 are provided with ballast 27 whose weight is determined as a function of the pressure that must be exerted on the water box for obtaining a proper soldering. The thrust rods 25 can obviously be operated by the workman in charge of running the machine. Nevertheless, it is preferable that said rods work automatically, which can be obtained as shown in FIG. 1 by providing underneath the table a control ramp 28 which is flat for its zone extending below the infrared radiation rows 20, then having a part 28 $a$ rising in the cooling zone A and a part 28 $b$ descending down to the entry into the zone where the infrared radiation rows 20 are located. The drawing also shows that the part of the ramp 28 which extends underneath the infrared radiation lamps 20 is at a lower level than that of the flat part of the thrust rods 25 so that said rods are completely free and exert thus their thrust on the water boxes to be soldered. Nevertheless, when no heat exchanger is in position in a mounting or if parts of the support table 10 exist not comprising a mounting, then the thrust rods bear on said flat part without affecting the working of the machine.

To facilitate the withdrawal of the soldered exchangers and positioning new exchanger parts for soldering, it is advantageous that the jibs 26 be turned in the charging zone B. For this, the thrust rods 25 can be provided with fingers or other projections 30 coming into contact with abutments such as 31 which make the thrust rods 25 pivot in one direction and the other.

Seeing that the mountings 11 are provided so that the height $h$ at which the parts to be soldered are always approximately constant, then the space separating these parts to be soldered from the infrared heating lamps 20 is also constant, so that an even heating is effected for a given passage time under said lamps, which enables excellent quality solderings to be carried out.

I claim:

1. Machine for effecting the soldering of water boxes onto collectors of heat exchangers, comprising a revolving table, mountings removably fitted on said table at the periphery thereof, said mountings having all identical sockets provided with supports suited for various types of water boxes and collectors of heat exchangers to be worked upon, at least the portions of said collectors to be soldered upon extend substantially always in the same horizontal plane, infrared radiation rows located beneath a fixed armature above said table on one part only of the periphery of said table, and thrust members provided to bear on the top of the water boxes of the exchangers positioned in the mountings.

2. Machine according to claim 1, wherein said the mountings are substantially of trapeze shape and placed side by side on the periphery of the revolving table.

3. Machine according to claim 1, characterized in that the thrust members are formed by axially movable rods and provided with a ballast.

4. Machine according to claim 3, characterized in that the rods forming the thrust members traverse the revolving table in guides and are placed over a ramp for operating, controlling their rise and descent, so that said thrust members are obliterated in a zone provided for the cooling of the soldered heat exchangers, and positioned for work at the end of a zone provided for positioning the heat exchangers to be soldered, in order to be actuated below the infrared heating rows.

5. Machine according to claim 1, characterized in that the peripheric edge of the table is provided with support members for receptacles intended to contain parts for positioning in the mountings in the charging zone of the machine.